INVENTOR.
RAYMOND W. ZIMMERMAN
BY
Hoppe and Mitchell

Aug. 24, 1965 R. W. ZIMMERMAN 3,202,117

TABLE LEAF ALIGNMENT DEVICE

Filed July 18, 1962

2 Sheets-Sheet 2

INVENTOR.
RAYMOND W. ZIMMERMAN
BY
Hoppe and Mitchell

United States Patent Office 3,202,117
Patented Aug. 24, 1965

3,202,117
TABLE LEAF ALIGNMENT DEVICE
Raymond W. Zimmerman, 31 21st Ave., San Francisco, Calif.
Filed July 18, 1962, Ser. No. 210,793
1 Claim. (Cl. 108—89)

This invention relates generally to extension tables and more particularly to an alignment and leveling device for extension tables and their extension leaves.

Heretofore, one of an adjacent pair of extension table parting surfaces normally has been fitted with projecting pins which mate with corresponding holes formed in the other of the adjacent parting surfaces to position and secure the table body or leaves. It is well known that the pins and their corresponding holes must be carefully aligned during manufacture so that the table surface and the peripheral edges of the table top are in exact alignment. The tolerances for the pins and mating holes must be small and hence are not easily adjusted. Moreover, the pins are easily bent or broken and it is a time consuming and costly operation to remove or repair a pin to exactly match the corresponding hole.

One object of this invention is to provide a simple and an inexpensive extension table leaf leveling and alignment device which can be economically mass-produced and which eliminates the costly drilling and matching methods presently employed.

Another object of the invention is to provide an alignment device by which a table parting surface can be fitted to a particular adjoining parting surface and universally fit all other similar surfaces as well.

Still another object of the invention is to provide a device for locking extension table parting surfaces securely in position and for aligning the top surface and peripheral edges by a simple closing motion of the table.

One other object of the invention is to provide a replaceable alignment device which employs greater tolerances in installation and operation than heretofore has been used for extension tables and the like.

Other objects and advantages of the invention will become apparent to those familiar with the extension table art upon a consideration of the following description and the accompanying drawings wherein FIG. 1 is a plan view of the underside of a typical extension table, without demountable extension leaves inserted, showing the location and arrangement of the alignment and leveling device of this invention;

Figure 1:
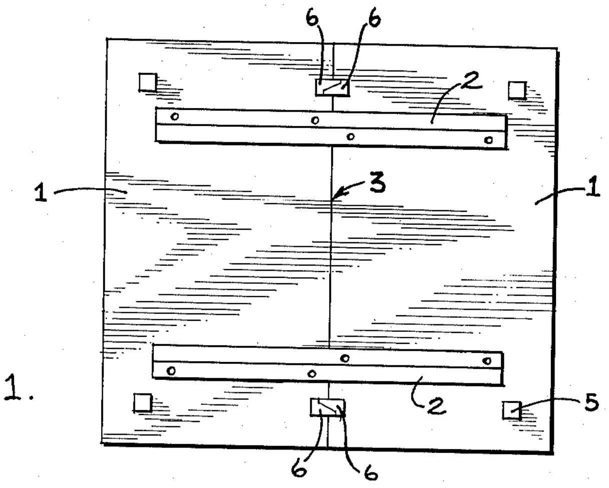
Figure 2:
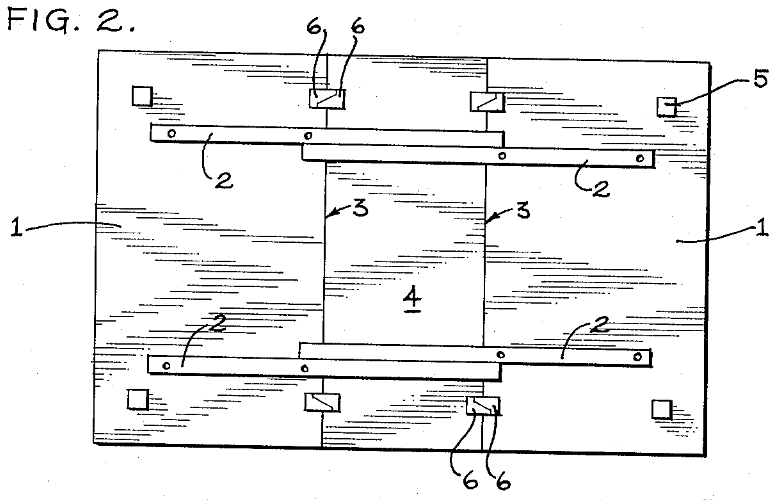
FIG. 2 is a plan view of the underside of the extension table of FIG. 1 with a demountable extension leaf in place.
Figure 3:
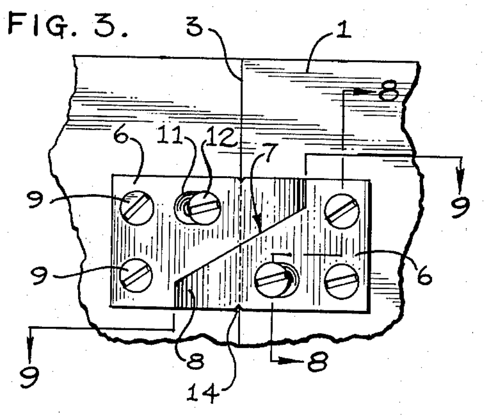
FIG. 3 is a plan view of a set of the devices of the invention in mating engagement.

FIGS. 1, 2 illustrate the underside of a typical extension table having a pair of table body leaves 1 mounted upon extension slides 2 so that the body leaves may be spread apart at parting surface 3 to receive, for example, a demountable extension leaf 4. FIGS. 1, 2 illustrate typical table legs as at 5.

Figure 4:
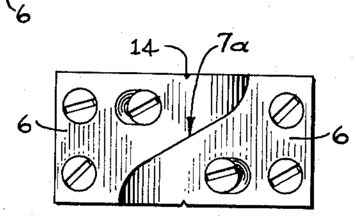
FIG. 4 is an embodiment of the device having modified lateral alignment surfaces.
Figure 9:
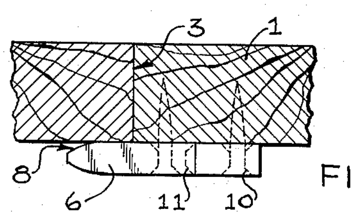
FIG. 9 is a sectional view of the device taken along line 9—9 of FIG. 3.

The leaf alignment and leveling device of this invention comprises a pair of mating fittings, generally referred to as 6, mounted on the underside of the various table leaves along their parting surfaces. The devices 6 are identical generally wedge-shaped plates each having a diagonal lateral alignment surface 7 which mates with a similar surface on the corresponding fitting. The devices are formed from any relatively rigid and durable material such as plastic, metal or the like. The devices may be molded, cast or machined from a solid plate or they may be sheet material with upset and formed mating surfaces. FIG. 4 illustrates a set of devices 6 having a curved rather than straight lateral alignment surface **7*a*. Each device 6 also has a generally wedge-shaped vertical alignment and support surface 8 formed on the nose of the wedge. The surface 8** appears most clearly in FIG. 9. It makes frictional contact with the adjoining table leaf itself and vertically supports the leaf.

Figure 8:
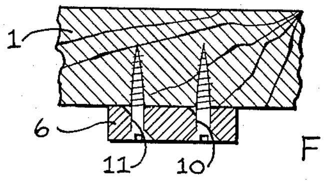
FIG. 8 is a sectional view of the device taken along line 8—8 of FIG. 3.

At least two pairs or sets of these identical fittings are mounted in mating arrangement on the underside of the table leaves along the parting surfaces as illustrated in FIGS. 1, 2. A pair of locking screws 9 inserted through locking holes 10 secures each of the devices to the table leaves. An adjustment screw slot 11 and adjustment screw 12 provide means for modifying the angularity of the lateral alignment surface 7 relative to the parting surface 3 of the leaf. As appears in FIGS. 8, 9, the holes for the several screws are countersunk on each side so that the fittings may be mounted with the lateral alignment surface 7 canted in either direction relative to the parting surface 3.

Figure 12:
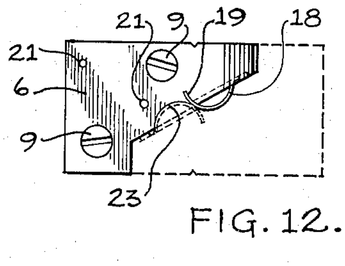
FIG. 12 is a modified form of the present invention having an anti-parting spring means along the lateral alignment surface.
Figure 11:
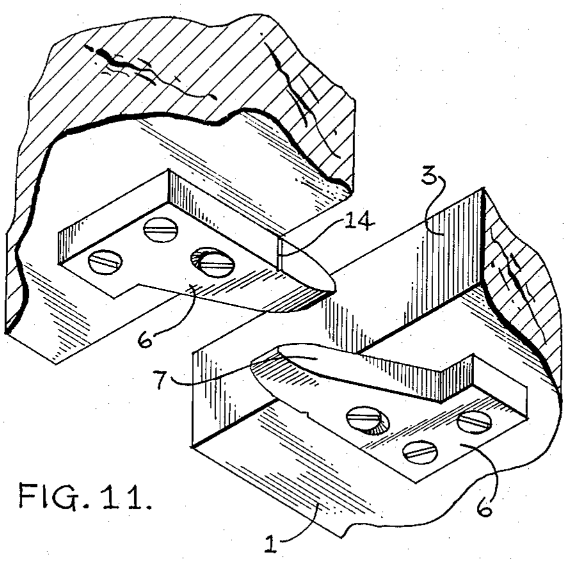
FIG. 11 is a perspective view of a set of devices of the present invention just prior to mating engagement.
Figure 13:
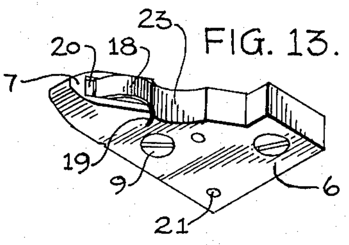
FIG. 13 is a perspective view of the modified form of the present invention illustrated in FIG. 12.

FIGS. 12 and 13 illustrate a modified attachment means including a pair of positioning and anti-torque pins 21 instead of the adjustment slot and screw arrangement. Locking screws 9 also are employed. Various other attachment means will be apparent to those familiar with this art.

Figure 10:
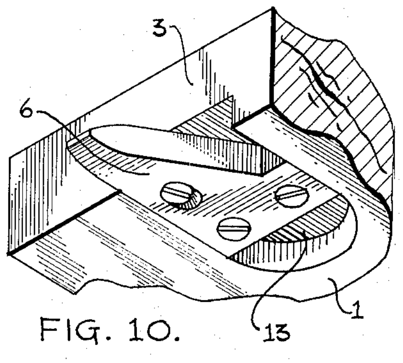
FIG. 10 is a perspective view of the present invention recessed to fit flush with the underside of the table.

FIG. 10 illustrates the device 6 of the present invention mounted in a recess 13 cut in the underside of the table leaf for flush mounting of the device.

The lateral alignment surfaces 7 may be mounted in various relationships. For purposes of illustration, the devices on the left hand table leaf 1 in FIGS. 1, 2 have the alignment surfaces 7 facing inwardly and those on the right hand table leaf 1 have their surfaces facing outwardly toward the table periphery. The devices on demountable leaf 4 assume a corresponding relationship and are appropriately spaced from the table longitudinal center line. As the table leaves move together along the extension slides 2 the several alignment devices 6 come into mating contact. Any variation in lateral alignment of the leaves is corrected by the sliding contact of the lateral alignment surfaces 7. Prior to closing the extension slides support the several demountable leaves 4. The vertical alignment surfaces 8 correct vertical leaf misalignment and also support closed adjoining leaves. Complete closing of the table securely locks the leaves in position both vertically and laterally by frictional contact. Misalignment in the initial installation of the devices may be corrected by adjustment of screw 12 and may be maintained by locking screws 9.

The devices 6 of the present invention are installed by placing the table top down on a flat surface with the parting surfaces in contact. One device of each set then is mounted along the parting surface on one of two adjoining table leaves. An installation locating notch 14 positions the device at the parting surface. After the table leaves are firmly closed the other device of each set is mounted on the adjoining leaf. The various demountable leaves 4 next are placed in position; the table is firmly closed so that all parting surfaces are in contact and the peripheral leaf edges and table surface properly aligned; and then the devices are installed and aligned in a similar manner upon the demountable leaves.

Figure 5:
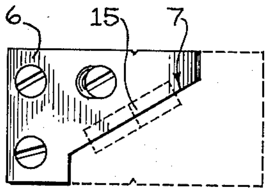
FIG. 5 is a modified form of the invention employing magnetic lateral alignment surfaces.
Figure 6:
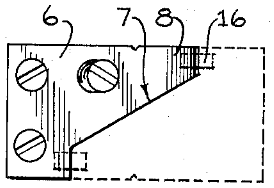
FIG. 6 is another modified form of the invention also employing magnetic mating surfaces.

Modified forms of the present invention having magnetic alignment surfaces are illustrated in FIGS. 5, 6. Dipole magnetic inserts assist in securing the mating faces of the devices in a closed position. The device of FIG. 5 carries magnetic inserts 15 along the lateral alignment surface 7. The device of FIG. 6 has magnetic inserts 16 on the vertical alignment surface 8. It will be apparent that the magnetization of the abutting inserts carried in the mating device 6 is of opposite polarity to insure magnetic attraction of the contact surfaces. Moreover, only one device of a set need carry magnetic inserts if the other is formed from magnetic material.

Figure 7:
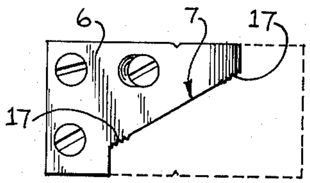
FIG. 7 is a modified form of the invention having locking notches along the mating alignment surfaces.

FIG. 7 illustrates another modified form of the device having notched or rough portions 17 of the lateral alignment surface 7 to maintain engagement of the devices 6 when the table leaves are closed.

Figure 14:
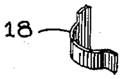
FIG. 14 is a perspective view of the anti-parting spring means employed in the device of FIGS. 12, 13.

FIGS. 12, 13 and 14 illustrate a modification of the invention which includes an anti-parting spring means 18 mounted along the lateral alignment surface 7. Each of the diagonal mating surfaces carries a crescent shaped leaf spring 18 mounted on the surface with a close clearance fit within a slot 19 cut transversely into the alignment surface. The springs upon being depressed fit into recesses 20 underlying them which are cut in the alignment surfaces. On closing of the table parting surfaces these springs 20 initially depress by contact with the spring of the mating alignment device and then expand slightly into detent 23 formed in the alignment surface of the mating device to interlock in the manner illustrated in FIG. 12 and prevent parting of the lateral alignment surfaces.

Figure 15:
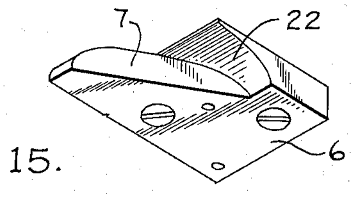
FIG. 15 is an embodiment of the invention employing a vertical leveling wear surface.

FIG. 15 illustrates a device 6 provided with a vertical leveling wear surface 22 lying outwardly from and perpendicular to the lateral alignment surface and inwardly from the locating notch 14 to the butt-end of the wedge. This wear surface engages the nose of the mating device to insure positive frictional engagement and to prevent abrasion of the table leaf material.

Various other modifications also will be obvious to those familiar with this art. The foregoing description and examples have been given for illustrative purposes only and no unnecessary limitations should be understood therefrom for the invention is defined in the following claim.

I claim:

Extension table leaf alignment and leveling means including at least two spaced pairs of generally wedge-shaped plates for mounting adjacent to the parting surfaces of adjoining table leaves, one on each of said adjoining leaves; said plates on each one of said leaves having divergent lateral alignment surfaces canted with respect to said parting surfaces; said lateral alignment surfaces of said pairs of plates being in frictional engagement with each other upon closing of said parting surfaces; and the nose of each of said plates having a vertical alignment surface for engaging and supporting the adjacent table leaf.

References Cited by the Examiner

UNITED STATES PATENTS

| | | | |
|---|---|---|---|
| 422,850 | 3/90 | Taylor | 292—300 |
| 1,099,780 | 6/14 | Weeks | 108—83 |
| 1,198,227 | 9/16 | Hinchey | 292—251.5 |
| 1,854,129 | 4/32 | Folsom | 108—64 |
| 2,463,911 | 3/49 | Sacks | 108—73 |
| 2,521,885 | 9/50 | Vasquez | 317—159 X |
| 2,619,394 | 11/52 | Mahr | 108—64 |
| 2,699,977 | 1/55 | Breslow | 108—64 |
| 2,737,430 | 3/56 | Ess | 108—64 |
| 2,857,223 | 10/58 | Furey | 108—64 |
| 2,890,087 | 6/59 | Stevens | 108—64 |
| 2,955,239 | 10/60 | Rouse | 292—251.5 |

FOREIGN PATENTS

| | | |
|---|---|---|
| 1,063,758 | 5/54 | France. |

FRANK B. SHERRY, *Primary Examiner.*